(12) United States Patent
Samuel (10) Patent No.: US 8,757,300 B2
(45) Date of Patent: Jun. 24, 2014

(54) RAM AIR GENERATOR FOR AN AUTOMOBILE

(75) Inventor: Woodson Wayne Samuel, Long Beach, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 541 days.

(21) Appl. No.: 13/050,837

(22) Filed: Mar. 17, 2011

(65) Prior Publication Data

US 2012/0234612 A1 Sep. 20, 2012

(51) Int. Cl.
*B60K 16/00* (2006.01)

(52) U.S. Cl.
CPC ..................................... *B60K 16/00* (2013.01)
USPC ............................ 180/2.2; 180/68.1; 180/165

(58) Field of Classification Search
CPC ................................. B60K 16/00; Y02T 10/90
USPC ................. 180/165, 2.1, 2.2, 68.1, 68.2, 68.3
See application file for complete search history.

(56) References Cited

U.S. PATENT DOCUMENTS

| | | | | |
|---|---|---|---|---|
| 3,374,849 A | * | 3/1968 | Redman | 180/2.2 |
| 3,556,239 A | * | 1/1971 | Spahn | 180/65.25 |
| 3,621,930 A | * | 11/1971 | Dutchak | 180/65.31 |
| 3,910,623 A | * | 10/1975 | McKeen | 296/91 |
| 4,075,545 A | * | 2/1978 | Haberer | 322/35 |
| 4,168,759 A | * | 9/1979 | Hull et al. | 180/2.2 |
| 4,254,843 A | * | 3/1981 | Han et al. | 180/165 |
| 4,314,160 A | * | 2/1982 | Boodman et al. | 290/55 |
| 4,356,796 A | * | 11/1982 | Tholen | 123/41.31 |
| 4,362,208 A | * | 12/1982 | Hauser | 165/51 |
| 4,460,055 A | * | 7/1984 | Steiner | 180/7.1 |
| 4,539,943 A | * | 9/1985 | Tsuchikawa et al. | 123/41.05 |
| 5,280,827 A | * | 1/1994 | Taylor et al. | 180/165 |
| 5,287,004 A | * | 2/1994 | Finley | 290/55 |
| 5,386,146 A | * | 1/1995 | Hickey | 290/55 |
| 5,481,433 A | * | 1/1996 | Carter | 361/690 |
| 5,680,032 A | * | 10/1997 | Pena | 290/52 |
| 5,746,283 A | * | 5/1998 | Brighton | 180/65.31 |
| 5,986,429 A | * | 11/1999 | Mula, Jr. | 320/101 |
| 6,138,781 A | * | 10/2000 | Hakala | 180/2.2 |
| 6,373,145 B1 | * | 4/2002 | Hamrick | 290/44 |
| 6,685,256 B1 | * | 2/2004 | Shermer | 296/180.4 |
| 6,838,782 B2 | * | 1/2005 | Vu | 290/55 |
| 6,857,492 B1 | * | 2/2005 | Liskey et al. | 180/165 |

(Continued)

FOREIGN PATENT DOCUMENTS

CA 2238742 12/1999

*Primary Examiner* — Hau Phan
*Assistant Examiner* — Jacob Meyer
(74) *Attorney, Agent, or Firm* — Snell & Wilmer LLP (57) ABSTRACT

The present invention relates to a ram air generator for an automobile, and more specifically to a ram air generator which improves an efficiency of an automobile. In one embodiment, the automobile can have, for example, an engine, a radiator, an ac condenser unit, and/or a ram air generator which can be located in an ambient air flow both of an engine. The automobile can also include a battery and/or a DC-DC converter connected to the ram air generator. The ram air generator receives ambient air in the ambient air flow path and generates energy from the ambient air. The energy generated by the ram air generator can be used to charge a battery and/or supply power to electronic devices through a DC-DC converter. The ram air generator can include a shroud, a fan blade assembly, an energy generation unit, and/or a regulator.

16 Claims, 4 Drawing Sheets

(56) References Cited

U.S. PATENT DOCUMENTS

| | | | |
|---|---|---|---|
| 6,882,059 B1* | 4/2005 | DePaoli | 290/44 |
| 6,897,575 B1* | 5/2005 | Yu | 290/44 |
| 7,147,069 B2* | 12/2006 | Maberry | 180/2.2 |
| 7,537,072 B2* | 5/2009 | Sturmon et al. | 180/68.1 |
| 7,547,983 B2* | 6/2009 | Sabella | 290/40 C |
| 7,644,793 B2* | 1/2010 | Iwasaki et al. | 180/68.2 |
| 7,810,589 B2* | 10/2010 | Frierman | 180/2.2 |
| 8,098,040 B1* | 1/2012 | Botto | 320/101 |
| 8,316,805 B2* | 11/2012 | Kardos et al. | 123/41.04 |
| 8,469,123 B1* | 6/2013 | Knickerbocker | 180/2.2 |
| 8,509,992 B1* | 8/2013 | Bosworth | 701/36 |
| 2002/0066608 A1* | 6/2002 | Guenard et al. | 180/65.3 |
| 2002/0153178 A1* | 10/2002 | Limonius | 180/2.2 |
| 2003/0155464 A1* | 8/2003 | Tseng | 244/58 |
| 2004/0084908 A1* | 5/2004 | Vu | 290/55 |
| 2004/0094341 A1 | 5/2004 | Appa et al. | |
| 2004/0226764 A1* | 11/2004 | Iwasaki et al. | 180/68.1 |
| 2005/0098361 A1* | 5/2005 | Mitchell | 180/2.2 |
| 2005/0121242 A1* | 6/2005 | Robinson | 180/165 |
| 2007/0107949 A1* | 5/2007 | Bradley et al. | 180/2.2 |
| 2007/0163829 A1* | 7/2007 | Ellis | 180/165 |
| 2007/0284155 A1* | 12/2007 | Cong | 180/2.2 |
| 2008/0017423 A1* | 1/2008 | Gasendo | 180/2.2 |
| 2008/0099261 A1* | 5/2008 | Sturmon et al. | 180/68.1 |
| 2008/0217922 A1 | 9/2008 | Chiu | |
| 2008/0272603 A1* | 11/2008 | Baca et al. | 290/55 |
| 2008/0284169 A1* | 11/2008 | Sabella | 290/43 |
| 2009/0277706 A1* | 11/2009 | Sturmon et al. | 180/68.1 |
| 2010/0006351 A1* | 1/2010 | Howard | 180/2.2 |
| 2010/0078235 A1* | 4/2010 | Tassin | 180/65.31 |
| 2010/0108411 A1* | 5/2010 | Bradley et al. | 180/2.2 |
| 2010/0140006 A1 | 6/2010 | Frierman | |
| 2011/0031043 A1* | 2/2011 | Armani et al. | 180/2.2 |
| 2012/0090717 A1* | 4/2012 | Watts | 138/26 |
| 2012/0211286 A1* | 8/2012 | Samuel | 180/2.2 |
| 2012/0318593 A1* | 12/2012 | Sturmon et al. | 180/68.1 |

* cited by examiner

RAM AIR GENERATOR FOR AN AUTOMOBILE

BACKGROUND

1. Field

The present invention relates to a ram air generator for an automobile, and more specifically to a ram air generator which improves an efficiency of an automobile.

2. Description of the Related Art

A conventional automobile can use a conventional internal combustion engine to power the automobile. However, the internal combustion engine combusts fuel which can lead to undesirable emissions. With increasingly strict governmental regulations, many automobile manufacturers are seeking to reduce emissions.

In addition, the conventional internal combustion engine usually combusts gasoline, which is a byproduct of oil. Unfortunately, oil may come from economically unstable regions. This can lead to drastic price fluctuations on the price of gasoline and can also lead to undesirable foreign policies.

Ethanol has also been suggested as an alternative. However, ethanol is typically produced from corn or other food products. Thus, the use of ethanol may also be controversial since the popularity of ethanol may impact food prices. Furthermore, while ethanol may combust in a cleaner manner than gasoline, it still produces emissions.

Thus, there is a need, for a ram air generator for an automobile to improve an efficiency of the automobile.

SUMMARY

The present invention relates to a ram air generator for an automobile, and more specifically to a ram air generator which improves an efficiency of an automobile. In one embodiment, the automobile can have, for example, an engine, a radiator, an ac condenser unit, and/or a ram air generator which can be located in an ambient air flow of an engine. The automobile can also include a battery, and/or a DC-DC converter connected to the ram air generator. Furthermore, a control unit including a processing unit and a sensor can be utilized to detect operational data and to control the operations of the engine, the radiator, the air conditioning condenser unit, the ram air generator, the battery, and/or the DC-DC converter.

The ram air generator receives ambient air in the ambient air flow path and generates energy from the ambient air. By being located in the ambient air flow path, an amount of drag created by the ram air generator is decreased. This increases the net energy generated by the ram air generator taking into account the drag created by the ram air generator. The energy generated by the ram air generator can be used, for example, to charge a battery and/or supply power to electronic devices through a DC-DC converter. This can reduce, for example, an amount of fuel consumed by the engine, thereby improving an overall fuel efficiency of the automobile. An increase in the overall fuel efficiency of the automobile reduces emissions by the automobile, allowing it to more easily meet governmental regulations. In addition, the improvement in overall fuel efficiency generally correlates with less fuel being consumed. Thus, dependence on the fuel, such as gasoline or ethanol, will be reduced. These have additional benefits both monetarily, and politically.

The ram air generator can include, for example, a shroud, a fan blade assembly, an energy generation unit, and/or a regulator. The shroud can receive and concentrate the ambient air to rotate the fan blade assembly. The rotation of the fan blade assembly can be used by the energy generation unit to generate energy. Furthermore, the regulator activates and deactivates the energy generation unit.

In addition, the control unit can control the operations of the engine, the radiator, the ac condenser unit, the ram air generator, the battery, and/or the DC-DC converter using the operational data. This can ensure, for example, that there is an efficient use of energy. This can also ensure, for example, that the use of the ambient air by the ram air generator does not significantly interfere with operations of the engine, the radiator, and/or the ac condenser unit.

In one embodiment, the present invention is a ram air generator for an automobile including a shroud located in an ambient air flow path of an engine, the shroud includes an inlet and an outlet, a fan blade assembly is located in the outlet of the shroud and is configured to be rotated by ambient air in the ambient air flow path, and an energy generation unit is connected to the fan blade assembly, wherein the energy generation unit generates energy based on the rotation of the fan blade assembly.

In another embodiment, the present invention is an automobile including an engine, a ram air generator located in an ambient air flow path of the engine, the ram air generator comprises a fan blade assembly and is configured to generate energy from a rotation of the fan blade assembly by the ambient air in the ambient air flow path, and a battery is connected to the ram air generator, wherein the ram air generator charges the battery.

In yet another embodiment, the present invention is a method for generating energy in an automobile including rotating a fan blade assembly from ambient air in an ambient air flow path of an engine, and generating energy from the rotation of the fan blade assembly.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
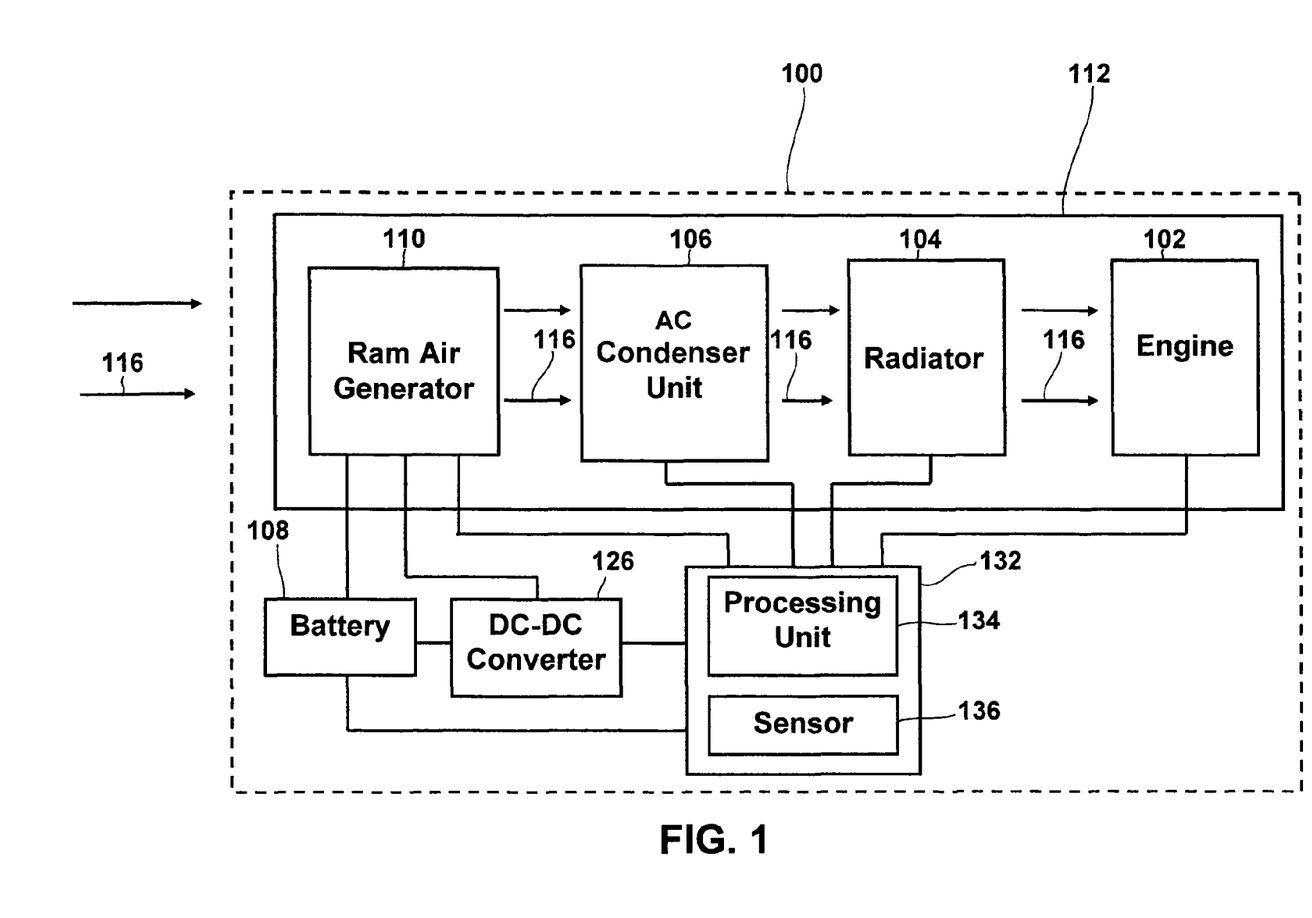
FIG. 1 is a box diagram of an automobile including a ram air generator according to an embodiment of the present invention.

As seen in FIG. 1, an automobile 100 can include an engine 104, a radiator 104, an air conditioning condenser unit 106, a ram air generator 110, a battery 108, a DC-DC converter 126, and/or a control unit 132. The automobile 100 can be, for example, an internal combustion engine automobile, a hybrid automobile, or any other type of automobile which includes an engine. In one embodiment, the automobile 100 can also include, for example, a hydrogen automobile.

The ram air generator 110, the air conditioning condenser unit 106, the radiator 104, and/or the engine 102 can be in an ambient air flow path 112 of an ambient air 116. That is, the ambient air 116 flows through the ram air generator 110, the air conditioning condenser unit 106, the radiator 104, and/or the engine 102.

The engine 102 uses the ambient air 116 to combust fuel to move the automobile 100. The engine 102 can be, for example, an internal combustion engine. The fuel can be, for example, gasoline, ethanol, or other material suitable for combustion by the engine 102 to move the automobile 100. The radiator 104 uses the ambient air 116 to cool the coolant which is used to cool the engine 102. The air conditioning condenser unit 106 uses the ambient air 116 to help cool hot coils within the air conditioning condenser unit 106.

The ram air generator 110 receives the ambient air 116 as it enters the automobile 100. The ram air generator 110 generates energy from the flow of the ambient air 116. The ram air generator 110 may increase the drag of the automobile 100, but can generate more than enough energy to offset the drag created by the ram air generator 110. In one embodiment, the ram air generator 110 can be located in an area which maximizes a net energy generated by the ram air generator 110. The net energy can be, for example, an amount of energy generated by the ram air generator 110 reduced by an amount of energy required to overcome the additional drag created by the ram air generator 110.

Thus, even though the ram air generator 110 may slow down the automobile 100, causing the engine 102 to combust more fuel, such additional combustion is offset by the fact that the engine 102 combusts less fuel to generate energy to power the electronic devices. Overall, with the use of the ram air generator 110, the engine 102 combusts less fuel, even with the additional combustion of fuel to overcome the drag created by the ram air generator 110.

The energy generated by the ram air generator 110 is supplied to the battery 108 and stored, and/or sent to the DC-DC converter 126 to power electronic devices in the automobile 100. The battery 108 can be, for example, a battery for a hybrid automobile. In addition, instead of the battery 108, a capacitor can be used. The capacitor can be, for example, a super capacitor. The electronic devices can be, for example, a motor, a radio, a navigation system, headlights, an entertainment system, movable seats, movable mirrors, displays, heaters, a 12 volt adapter outlet, and/or any other devices which require electricity to operate in the automobile 100.

Figure 2:
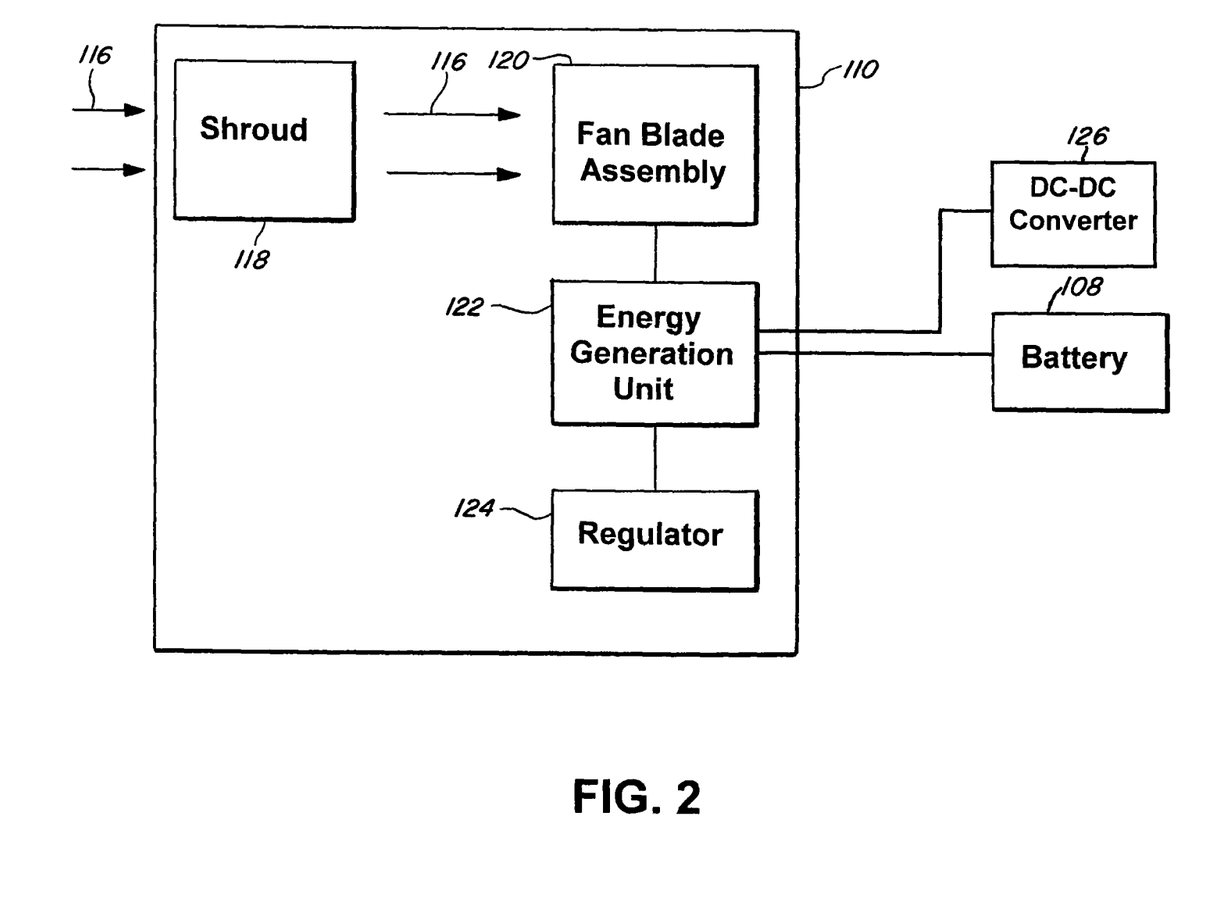
FIG. 2 is a box diagram of a ram air generator according to an embodiment of the present invention.

The ram air generator 110 can be seen, for example, in FIG. 2. The ram air generator 110 can include, for example, a shroud 118, a fan blade assembly 120, an energy generation unit 122, and/or a regulator 124. The shroud 118 receives and concentrates the ambient air 116. In one embodiment, the shroud 118 can be relatively flat and can have, for example, a larger inlet than outlet. In another embodiment, the shroud 118 can have a conical shape. In yet another embodiment, the shroud 118 can have a shape which concentrates the ambient air 116. Furthermore, the shroud 118 can be configured to have an extension which can collect air from above or below the automobile 100.

The concentrated ambient air 116 is then passed through the fan blade assembly 120. In one embodiment, the fan blade assembly 120 can be located, for example, in the shroud 118, or adjacent to the shroud 118. For example, the fan blade assembly 120 can be located in the inlet of the shroud 118, or adjacent to the inlet of the shroud 118.

As the concentrated ambient air 116 passes through the fan blade assembly 120, the fan blade assembly 120 is rotated. The energy generation unit 122 uses the rotation of the fan blade assembly 120 to generate energy. The energy generation unit 122 can be, for example, a generator. The generator can be, for example, a motor such as a DC motor. In addition, the generator can be, for example, an AC generator. In one embodiment, the generator can be a generator that uses electromagnetic induction to produce electrical voltage.

The energy generation unit 122 supplies energy to the battery 108 and/or the DC-DC converter 126. However, if the energy generation unit 122 includes an AC generator, an AC-DC converter can be used instead of the DC-DC converter 126. In one embodiment, the energy generation unit 122 can include an alternator. In addition, the energy generation unit 122 can be, for example, integrated in the fan blade assembly 120. Also, multiple energy generation units and/or fan blade assemblies may be used. Also, while only a single hole is depicted where the fan blade assembly 120 resides, multiple holes may be used for multiple fan blade assemblies.

The regulator 124 is connected to the energy generation unit 122. The regulator 124 can regulate, for example, a voltage of the energy generated in the energy generation unit 122. This can ensure that no abnormal spikes in voltage occurs which could damage, for example, the battery 108 and/or the DC-DC converter 126. In addition, the regulator 124 can, for example, activate or deactivate the energy generation unit 122.

Figure 3:
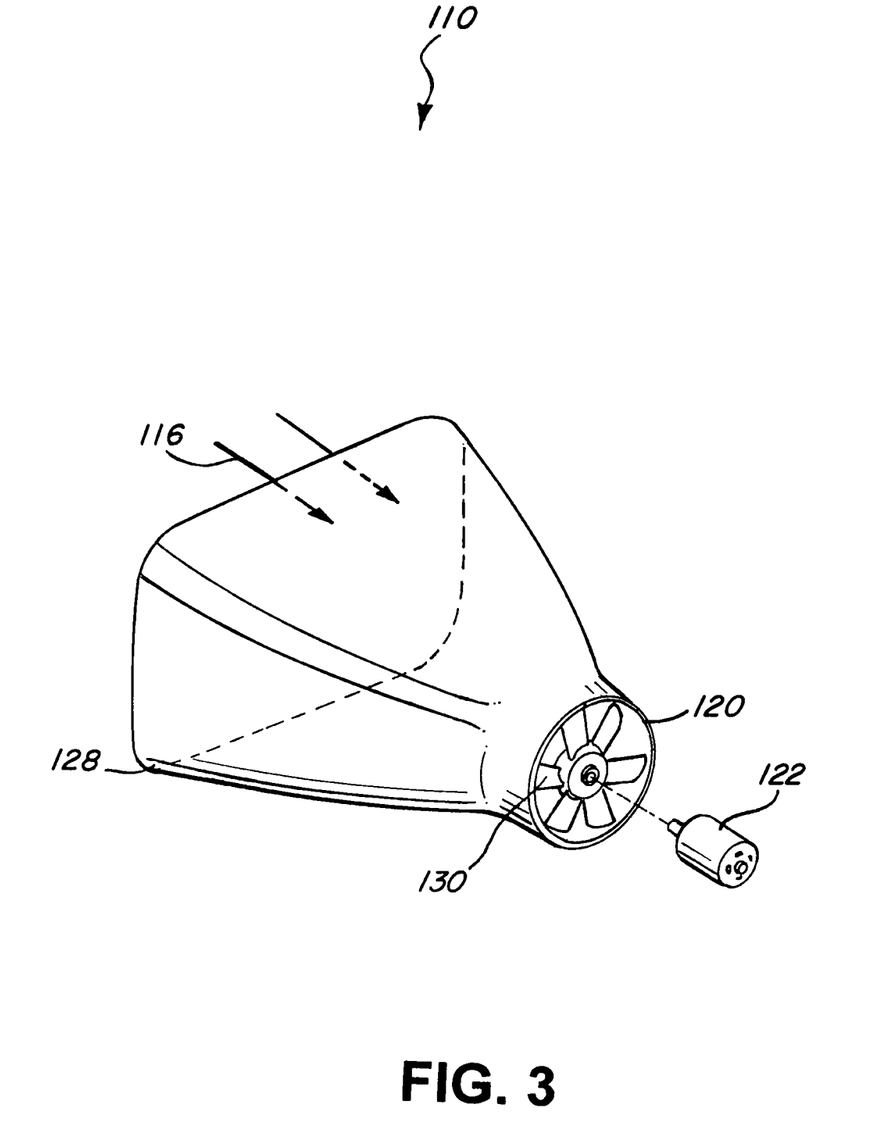
FIG. 3 is a perspective view of a portion of a ram air generator according to an embodiment of the present invention.

FIG. 3 depicts portions of a ram air generator 110 according to an embodiment of the present invention. As seen in FIG. 3, the shroud 118 can include, for example, an inlet 128 and an outlet 130. The inlet 128 can be wider than the outlet 130 to concentrate the ambient air 116. Furthermore, the fan blade assembly 120 can rotate based on its reception of the ambient air 116.

Although only a single fan blade assembly 120 is shown in FIG. 3, multiple fan blade assemblies may be used. In addition, the number of fins in the single fan blade assembly 120 can be varied. Furthermore, in one embodiment, one or more fins in the single fan blade assembly 120 can be rotatable such that it can change its angle of attack with respect to the ambient air 116. In another embodiment, the shroud 118 is pivotable and can move depending on the directional flow of the ambient air 116. The energy generation unit 122 can be connected, for example, to the fan blade assembly 120 and can generate energy when the fan 130 is rotated or rotating.

Referring back to FIG. 1, the control unit 132 is connected, for example, to the engine 102, the radiator 104, the air conditioning condenser 106, the battery 108, the ram air generator 110, and/or the DC-DC converter 126. The control unit 132 can detect, for example, operational data, and control, for example, the operations of the engine 102, the radiator 104, the air conditioning condenser 106, the battery 108, the ram air generator 110, and/or the DC-DC converter 126 using in part, the operational data.

In one embodiment, the control unit 132 can include, for example, a processing unit 134 and/or a sensor 136. The sensor 136 can detect, for example, the operation data, while the processing unit 134 can control, for example, the operations of the engine 102, the radiator 104, the air conditioning condenser 106, the battery 108, the ram air generator 110, and/or the DC-DC converter 126 using in part, the operational data. The sensor 136 need not be a single type of sensor, but instead can be a variety of different types of sensors adapted to detect the various types of operational data. In addition, the sensor 136 can be located not just in a single location, but in various locations throughout the automobile 100.

The operational data can include, for example, energy level data indicating an energy level of the battery 108 and/or an energy draw requirement of the DC-DC converter. The operational data can also include, for example, energy production data indicating an amount of energy produced by the ram air generator. The operational data can also include, for example, ambient air data indicating, for example, characteristics of the ambient air such as velocity and direction. The operational data can also include, for example, temperature data indicating, for example, a temperature of the air conditioning condenser unit 106, the radiator 104, and/or the engine 102.

For example, if the operational data detected by the sensor 136 indicates that the ram air generator 110 will be able to generate a lot of energy, and the DC-DC converter 126 requires a lot of energy, then more energy may be diverted to the DC-DC converter instead of being stored in the battery 108. Furthermore, if the DC-DC converter 126 does not use all of the energy, the remaining energy can be stored in the battery 108.

However, if the operational data detected by the sensor 136 indicates that the air conditioning condenser unit 106, the radiator 104, and/or the engine 102 requires more ambient air 116 to flow through their respective components due to an increased temperature, the ram air generator 110 can reduce production of energy in order to allow greater airflow through the ram air generator 110 to the air conditioning condenser unit 106, the radiator 104, and/or the engine 102. Likewise, if the operational data detected by the sensor 136 indicates that the ambient air 116 has a low velocity, the processing unit 134 can control the ram air generator 110 to deactivate.

Figure 4:
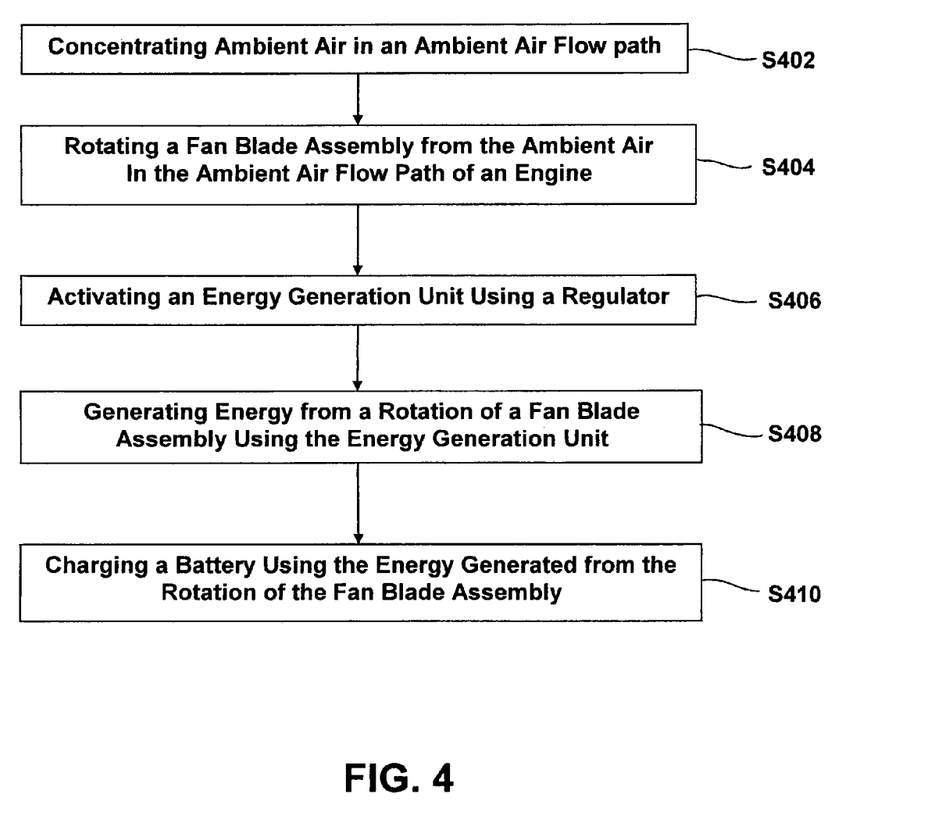
FIG. 4 depicts a process according to an embodiment of the present invention.

In one embodiment, the present invention is a process as shown in FIG. 4. In Step S402, ambient air in an ambient air flow path is concentrated. For example, the ambient air 116 is concentrated in the ambient air flow path 112 of the engine 102 using the shroud 118. In Step S404, a fan blade assembly can be rotated from the ambient air in the ambient air flow path of an engine. For example, the fan blade assembly 120 can be rotated from the ambient air 116 in the ambient air flow path 112.

In Step S406, an energy generation unit can be activated using a regulator. For example, the energy generation unit 122 can be activated using the regulator 124. In Step S408, energy is generated from a rotation of a fan blade assembly using the energy generation unit. For example, energy is generated from the rotation of the fan blade assembly 120 using the energy generation unit 122. In Step S410, a battery is charged using the energy generated from the rotation of the fan blade assembly. For example, the battery 108 is charged using the energy generated from the rotation of the fan blade assembly 120. In another embodiment, the energy can be used by a DC-DC converter to power electronic devices. In yet another embodiment, a capacitor can be used instead of the battery 108. The capacitor can be, for example, an ultra capacitor.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. An automobile comprising:
   an engine;
   a ram air generator located in an ambient air-flow path of the engine, the ram air generator comprising a fan and configured to generate energy from a rotation of the fan by an ambient air in the ambient air-flow path;
   a battery connected to the ram air generator, wherein the ram air generator is configured to charge the battery;
   a sensor configured to detect operational data including at least ambient air data indicating a velocity of the ambient air or a direction of the ambient air; and a control unit connected to the sensor and configured to control an operation of the ram air generator or the charging of the battery based on the detected operational data.

2. The automobile of claim 1 wherein the ram air generator includes:
a shroud located in the ambient air-flow path, the shroud including an inlet and an outlet, wherein the fan is located in the outlet of the shroud; and
an energy generation unit connected to the fan, wherein the energy generation unit generates energy based on the rotation of the fan.

3. The automobile of claim 2 wherein the shroud is substantially flat and a width of the inlet is greater than a width of the outlet, and the shroud concentrates the ambient air in the ambient air-flow path.

4. The automobile of claim 2 further comprising:
an air conditioning condenser located between the shroud and the engine, and in the ambient air-flow path; and
a radiator located between the shroud and the engine, and in the ambient air-flow path.

5. The automobile of claim 2 wherein the energy generation unit is a generator or an alternator.

6. The automobile of claim 2 further comprising a regulator connected to the energy generation unit, the regulator configured to activate the energy generation unit,
wherein the energy generation unit is configured to charge the battery when the energy generation unit is active.

7. The automobile of claim 1 further comprising an energy converter connected to the ram air generator for converting the energy generated by the ram air generator and supplying the converted energy to at least one electronic device of the automobile, wherein:
the operational data further corresponds to at least one of an energy level of the battery, an amount of energy produced by the ram air generator, or an energy draw requirement of the energy converter, and
the control unit is configured to increase supplying of the generated energy from the ram air generator to the energy converter when the operational data indicates that the ram air generator can convert an increased amount of energy and can supply the increased amount of energy to the at least one electronic device.

8. The automobile of claim 4 wherein:
the operational data corresponds to at least one of a temperature of the radiator, a temperature of the air conditioning condenser, or a temperature of the engine, and
the control unit is further configured to decrease energy production of the ram air generator in order to allow greater airflow through the radiator, the air conditioning condenser, or the engine when an increase in at least one of the temperature of the radiator, the temperature of the air conditioning condenser, or the temperature of the engine indicates that more ambient air is needed for cooling the radiator, the air conditioning condenser, or the engine.

9. An automobile comprising:
an engine;
a battery for powering movement of the automobile;
a ram air generator located in an ambient air-flow path of the engine, the ram air generator comprising a fan and configured to generate energy from a rotation of the fan by an ambient air in the ambient air-flow path for charging the battery or for powering at least one electronic device of the automobile;
an energy converter connected to the ram air generator for converting the energy generated by the ram air generator and supplying the converted energy to the at least one electronic device of the automobile;
a sensor configured to detect operational data corresponding to at least a characteristic of the ambient air; and
a control unit connected to the sensor and configured to:
control an operation of the ram air generator or the charging of the battery based on the detected operational data, and
increase supplying of energy from the ram air generator to the energy converter when the operational data indicates that the ram air generator can convert an increased amount of energy and can supply the increased amount of energy to the at least one electronic device.

10. The automobile of claim 9, further comprising:
a radiator located in the ambient airflow path; and
an air conditioning condenser located in the ambient air-flow path, wherein:
the operational data further corresponds to at least one of a temperature of the radiator, a temperature of the air conditioning condenser, or a temperature of the engine, and
the control unit is further configured to decrease energy production of the ram air generator in order to allow greater airflow through the radiator, the air conditioning condenser, or the engine when an increase in at least one of the temperature of the radiator, the temperature of the air conditioning condenser, or the temperature of the engine indicates that more ambient air is needed for cooling the radiator, the engine, or the air conditioning condenser.

11. The automobile of claim 9 wherein the characteristic of the ambient air corresponds to a velocity of the ambient air.

12. The automobile of claim 9 wherein the characteristic of the ambient air corresponds to a direction of the ambient air.

13. An automobile comprising:
an engine;
a battery for powering movement of the automobile;
a ram air generator located in an ambient air-flow path of the engine, the ram air generator comprising a fan and configured to generate energy from a rotation of the fan by the ambient air in the ambient air-flow path for charging the battery or for powering at least one electronic device of the automobile;
an energy converter connected to the ram air generator for converting the energy generated by the ram air generator and supplying the converted energy to the at least one electronic device of the automobile;
a radiator located in the ambient airflow path;
an air conditioning condenser located in the ambient air-flow path;
a sensor configured to detect operational data corresponding to a temperature of the radiator, a temperature of the air conditioning condenser, or a temperature of the engine; and
a control unit connected to the sensor and configured to:
control an operation of the ram air generator or the charging of the battery based on the detected operational data, and
decrease supplying of energy from the ram air generator to the energy converter when an increase in the temperature of the radiator, the temperature of the air conditioning condenser, or the temperature of the engine indicates that more ambient air is needed for cooling the radiator, the air conditioning condenser or the engine.

14. The automobile of claim 13 wherein the ram air generator includes:
   a shroud located in the ambient air-flow path, the shroud including an inlet and an outlet, wherein the fan is located in the outlet of the shroud; and
   an energy generation unit connected to the fan, wherein the energy generation unit generates energy based on the rotation of the fan.

15. The automobile of claim 14 wherein the shroud is substantially flat and a width of the inlet is greater than a width of the outlet, and the shroud concentrates the ambient air in the ambient air-flow path.

16. The automobile of claim 13 further comprising a regulator connected to the energy generation unit, the regulator configured to activate the energy generation unit,
   wherein the energy generation unit is configured to charge the battery when the energy generation unit is active.

* * * * *